3,507,884
2,6-DIOXACYCLOHEXANONES HAVING AN UNSATURATED ALIPHATIC GROUP IN THE 4-POSITION
Fritz Hostettler and Eugene F. Cox, Charleston, W. Va., assignors to Union Carbide Corporation, a corporation of New York
No Drawing. Continuation of application Ser. No. 355,447, Mar. 27, 1964. This application Oct. 17, 1968, Ser. No. 770,891
Int. Cl. C07d 15/04
U.S. Cl. 260—340.2        19 Claims

ABSTRACT OF THE DISCLOSURE

A class of 2,6-dioxacyclohexanones having an unsaturated group in the 4-position, e.g., 4-methyl-4-allyl-2,6-dioxacyclohexanone, are prepared by an Aldol condensation of an aldehyde with formaldehyde, followed by a Cannizzaro reaction and finally a lower temperature phosgenation or ester interchange. The compositions are useful in the production of linear solid polymeric products.

---

This application is a continuation of Ser. No. 355,447, filed Mar. 27, 1964, now abandoned, which in turn is a continuation-in-part of an application entitled "Polymers of Cyclic Compounds," Ser. No. 311,653, filed Sept. 26, 1963 by F. Hostettler and E. F. Cox, now Patent No. 3,280,078.

This invention relates to novel unsaturated carbonates and to a process for their preparation. In one aspect, this invention relates to a class of novel carbonates having one olefinically unsaturated group. In a further aspect, this invention relates to novel unsaturated carbonates which are useful in the preparation of a variety of polymeric compositions.

The unsaturated carbonate compounds which can be prepared by the process of this invention can be conveniently represented by the following formula:

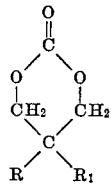

wherein R and $R_1$ represent monovalent organic groups attached to the ring carbon atom by a carbon to carbon bond, said R variables being free from acetylenic unsaturation and containing a sum total of at least three carbon atoms, two of said carbon atoms being bonded by olefinic unsaturation. Preferred compositions are those wherein each R variable individually represents an aliphatic, alicyclic, or aromatic group containing up to 24 carbon atoms. Also preferred are those compositions represented by the above formula wherein R represents a hydrocarbyl group containing from 1 to 24 carbon atoms, $R_1$ represents a hydrocarbyl, hydrocarbyloxymethyl, or hydrocarboyloxymethyl group containing from 2 to 24 carbon atoms, and one of said R variable contains an olefinically unsaturated double bond. Particularly preferred compositions are those wherein R represents alkyl, cycloalkyl, cycloalkylalkyl, alkylcycloalkyl, alkylcycloalkylalkyl, aryl, aralkyl, alkaryl, alkarylalkyl and alkoxymethyl groups containing from 1 to 24 carbon atoms, more preferably 1 to 18 carbon atoms, and $R_1$ represents alkenyl, cycloalkenyl, alkylcycloalkenyl, cycloalkenylalkyl, alkylcycloalkenylalkyl, alkenyloxyalkyl, cycloalkenyloxyalkyl, alkylcycloalkenyloxyalkyl, alkenylcycloalkyloxyalkyl, alkenylaryloxyalkyl, alkenoyloxyalkyl, cycloalkenoyloxyalkyl, alkylcycloalkenoyloxyalkyl, alkenylcycloalkanoyloxyalkyl and alkenylaroyloxyalkyl groups containing from 2 to 24 carbon atoms, and more preferably 2 to 18 carbon atoms.

Illustrative compounds encompassed by the aforementioned formula and which can be prepared by the process of the instant invention include, among others, 4-methyl-4 - vinyl - 2,6-dioxacyclohexanone, 4-methyl-4-allyloxymethyl - 2,6-dioxacyclohexane, 4-propyl-4-acryloyloxymethyl - 2,6-dioxacyclohexane, 4-methyl-4-(cyclohex-4-enyl)-2,6-dioxacyclohexanone, 4-phenyl-4-allyloxymethyl-2,6-dioxacyclohexanone and the like.

The novel unsaturated carbonates of the present invention are economically attractive compositions and are useful in numerous fields of application. For example, the olefinic bond in the carbonate can be epoxidized to give novel compositions which are useful as stabilizers for various resin systems. Additionally, the unsaturated carbonates are relatively reactive materials which homopolymerize or copolymerize readily with other reactive cyclic monomers to provide a useful class of polymeric compounds. These polymers can range from viscous liquids to extremely tough solids. The very viscous liquids of relatively low molecular weight, are useful in the preparation of polishes, and waxes, and as thickening agents for various lubricants. The polymers can be employed as protective coatings and impregnants. These polymers are also useful for the production of various shaped articles such as brush handles, buttons, lamp bases, toys, and the like. Moreover, since the compositions of this invention are difunctional in that each compound contains two reactive groups, i.e., the carbonate group and the olefinic double bond, they are particularly useful in those fields of application wherein polyfunctionality is desired. For example, the unsaturated carbonates are useful as co-monomers in the polymerization of cyclic esters to high molecular weight polymers wherein it is desired to build a cross-linkable site, e.g., a double bond, into the polymeric network. The novel compositions of this invention are also useful as intermediates in the preparation of numerous chemical compounds, such as unsaturated carbamates, and the like.

It is, therefore, an object of the present invention to provide a class of novel unsaturated carbonates which are suitable for use in the preparation of a variety of polymeric materials. A further object of this invention is to provide a class of novel carbonates having polyfunctional properties. Another object is to provide new compositions of matter comprising the 4,4-disubstituted-2,6-dioxacyclohexanones. A further object of this invention is to provide novel compositions of matter comprising the 2,6-dioxacyclohexanones having one olefinically unsaturated group attached at the 4-position. Another object is to provide a novel process for the preparation of the aforesaid compositions. These and other objects will readily become apparent to those skilled in the art in the light of the teachings herein set forth.

In its broad aspect, this invention is directed to novel unsaturated carbonates of the aforementioned general formula and to process for their preparation. These compositions are multifunctional in nature in that each compound is characterized by the presence of the carbonate group and one olefinically unsaturated group in the molecule.

In one embodiment, the present invention is directed to novel unsaturated carbonates represented by the formula:

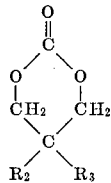

wherein $R_2$ represent a hydrocarbyl or hydrocarbyloxyalkyl group free from olefinic unsaturation and which contains from 1 to 24 carbon atoms, more preferably 1 to 18 carbon atoms and $R_3$ represents a hydrocarbyl group of from 2 to 24 carbon atoms, more preferably 2 to 18, and which contains one olefinically unsaturated group. Preferred compositions are those wherein $R_2$ represents alkyl, cycloalkyl, cycloalkylalkyl, alkylcycloalkyl, alkylcycloalkylalkyl, aryl, aralkyl, alkaryl, alkarylalkyl and alkoxyalkyl groups of from 1 to 24 carbon atoms and $R_3$ represents alkenyl, cycloalkenyl, alkylcycloalkenyl, cycloalkenylalkyl, alkenylcycloalkyl, alkenylcycloalkylalkyl, alkenylaryl and alkenylarylalkyl groups of from 2 to 24 carbon atoms.

Illustrative compounds within this embodiment and encompassed by the aforementioned formula include, among others, the mono-alkenyl, mono-alkyl substituted 2,6-dioxacyclohexanones, e.g., 4-vinyl-4-methyl-2,6-dioxacyclohexanone, 4 - allyl - 4-methyl-2,6-dioxacyclohexanone, 4-methyl - 4 - (but - 3 - enyl)-2,6-dioxacyclohexanone, 4-methyl - 4 - (hex - 5 - enyl)-2,6-dioxacyclohexanone, 4-ethyl - 4 - (non - 8 - enyl)-2,6-dioxacyclohexanone, 4-methyl - 4 - (dodec - 11 - enyl)-2,6-dioxacyclohexanone, 4 - ethyl - 4 - (octadec - 17 - enyl) - 2,6 - dioxacyclohexanone, 4 - propyl - 4 - (eicos - 19 - enyl) - 2,6 - dioxacyclohexanone, 4 - methyl-4-(tetracos-23-enyl)-2,6-dioxacyclohexanone, and the like; the mono-alkoxyalkyl, monoalkenyl substituted 2,6-dioxacyclohexanones, e.g., 4-allyl-4-methoxymethyl - 2,6 - dioxacyclohexanone, 4-propoxymethyl - 4(hex - 5 - enyl)-2,6 - dioxacyclohexanone, 4-butoxymethyl - 4 - (dodec - 11 - enyl) - 2,6 - dioxacyclohexanone, and the like; the mono-cycloalkyl, mono-alkenyl substituted 2,6-dioxacyclohexanones, e.g., 4 - cyclohexyl - 4 - allyl - 2,6 - dioxacyclohexanone, 4 - cyclohexylmethyl - 4 - (hex - 5 - enyl)-2,6-dioxacyclohexanone, 4-(6-methylcyclohexylmethyl) - 4 - (but-3-enyl) - 2,6-dioxacyclohexanone, and the like; the mono-aryl, mono-alkenyl-2,6 - dioxacyclohexanones, e.g., 4-phenyl - 4 - allyl - 2,6-dioxacyclohexanone, 4 - tolyl - 4 - (but - 3 - enyl)-2,6-dioxacyclohexanone, 4 - benzyl - 4 (hex - 5 - enyl) - 2,6-dioxacyclohexanone, and the like; the mono-alkyl, monocycloalkenyl-2,6-dioxacyclohexanones, e.g., 4 - methyl-4-(cyclohex - 3 - enyl) - 2,6-dioxacyclohexanone, 4-butyl-4-(4-methylcyclohex-3-enyl) - 2,6-dioxacyclohexanone, 4-butyl - 4 - (cyclohex-3-enylmethyl)-2,6-dioxacyclohexanone, and the like; the mono-alkyl-monoalkenylaryl substituted-2,6-dioxacyclohexanones, e.g., 4-propyl-4-styryl-2,6 - dioxacyclohexanone, 4 - pentyl-4[4-(but-3-enyl) phenyl]-2,6-dioxacyclohexanone, and the like.

In a second embodiment, the present invention encompasses the novel unsaturated carbonates represented by the formula:

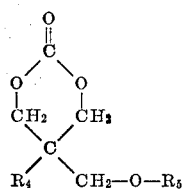

wherein $R_4$ represents a hydrocarbyl or hydrocarbyloxyalkyl group free from olefinic unsaturation and which contains from 1 to 24 carbon atoms, more preferably 1 to 18 carbon atoms, and $R_5$ represents a hydrocarbyl group of from 2 to 23 carbon atoms, more preferably from 2 to 17 carbon atoms, and which contains one olefinically unsaturated group. Preferred compositions are those where $R_4$ represents alkyl, cycloalkyl, cycloalkylalkyl, alkylcycloalkyl, alkylcycloalkylalkyl, aryl aralkyl, alkaryl, alkarylalkyl and alkoxyalkyl groups from 1 to 24 carbon atoms, and $R_5$ represents alkenyl, cycloalkenyl, alkylcycloalkenyl, cycloalkenylalkyl, alkenylcycloalkyl, alkenylcycloalkylalkyl, alkenylaryl and alkenylarylalkyl groups of from 2 to 23 carbon atoms.

Illustrative compounds within this embodiment and encompassed by the aforementioned formula include, among others, the mono-alkyl, monoalkenyloxymethyl substituted 2,6-dioxacyclohexanones, e.g., 4-methyl-4-allyloxymethyl - 2,6 - dioxacyclohexanone, 4 - ethyl - 4-allyloxymethyl - 2,6 - dioxacyclohexanone, 4 - ethyl - 4-(pent - 4 - enyloxymethyl) - 2,6 - dioxacyclohexanone, 4-butyl - 4 - (oct - 7 - enyloxymethyl) - 2,6 - dioxacyclohexanone, 4 - pentyl - 4 - (dodec - 11 - enyloxy - 4-methyl) - 2,6 - dioxacyclohexane, 4 - hexyl - 4 - (octadec-17-enyloxymethyl)-2,6-dioxacyclohexanone and the like; the mono-alkyl, monocycloalkenyloxymethyl substituted 2,6 - dioxacyclohexanones, e.g., 4 - methyl-4-(cyclohex-3-enyloxymethyl) - 2,6 - dioxacyclohexanone, 4 - propyl 4 - (4 - methylcyclohex - 3 - enyloxymethyl) - 2,6 - cyclohexanone, 4 - pentyl - 4 - (cyclohex - 3 - enylmethyloxymethyl)-2,6-dioxacyclohexanone, and the like; the monoalkyl, mono-alkenylaryloxymethyl substituted 2,6-dioxacyclohexanones, e.g., 4-methyl-4-styryl-2,6-dioxacyclohexanone, 4 - propyl - 4 - (4 - but - 3 - enylphenoxymethyl)-2,6,-dioxacyclohexanone, and the like; the mono-cycloalkyl, mono-alkenylmethyl 2,6-dioxacyclohexanones, e.g., 4 - cyclohexyl - 4 - allyloxymethyl - 2,6 - dioxacyclohexanone, 4-cyclohexylmethyl-4-(pent-4-enyloxymethyl)-2,6-dioxacyclohexanone, 4-(6-methylcyclohexylmethyl-4-(hex-5-enyloxymethyl)-2,6-dioxacyclohexanone, and the like; the mono-aryl, mono-alkenyl substituted 2,6-dioxacyclohexanones, e.g., 4-phenyl-4-allyloxymethyl-2,6 - dioxacyclohexanone, 4-phenylmethyl-4-(hex-5-enyloxymethyl)-2,6 - dioxacyclohexanone, 4-tolyl-4-(oct-7-enyloxymethyl-2,6-dioxacyclohexanone, and the like.

In a further embodiment, the present invention encompasses novel unsaturated carbonates represented by the formula:

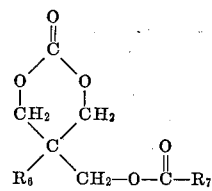

wherein $R_6$ represents a hydrocarbyl or hydrocarbyloxyalkyl group free from olefinic unsaturation and which contains from 1 to 24 carbon atoms, more preferably 1 to 18 carbon atoms, and $R_7$ represents a hydrocarbyl group of from 2 to 22 carbon atoms, more preferably 2 to 16 carbon atoms, and which contains one olefinically unsaturated group. Preferred compositions are those wherein $R_6$ represents alkyl, cycloalkyl, cycloalkylalkyl, alkylcycloalkyl, alkylcycloalkylalkyl, aryl, aralkyl, alkaryl, alkarylalkyl and alkoxyalkyl groups of from 1 to 24 carbon atoms and $R_7$ represents alkenyl, cycloalkenyl, alkylcycloalkenyl, cycloalkenylalkyl, alkenylcycloalkyl, alkenylcycloalkylalkyl, alkenylaryl and alkenylarylalkyl groups of from 2 to 22 carbon atoms.

Illustrative compounds within this embodiment and encompassed by the aforesaid formula include, among others, the mono-alkyl, mono-alkenoyloxymethyl substituted 2,6-dioxaycyclohexanones, e.g., 4-methyl-4-acryloyloxymethyl - 2,6 - dioxacyclohexanone, 4 - pentyl - 4 acryloyloxymethyl - 2,6 - dioxacyclohexanone, 4 - dodecyl - 4 - acryloyloxymethyl - 2,6 - dioxacyclohexanone, 4 - hexyl - 4 - crotonoyloxymethyl - 2,6 - dioxacyclohexanone, 4 - dodecyl - 4 - methacryloyloxymethyl - 2,6- dioxacyclohexanone, 4 - propyl - 4 - senecioyloxymethyl-2,6-dioxacyclohexanone, and the like; the mono-alkyl, mono-cyclohexenoyloxymethyl substituted 2,6-dioxacyclohexanones, e.g., 4-methyl - 4 - (cyclohex - 3 - enoyloxymethyl) - 2,6 - dioxacyclohexanone, 4 - propyl - 4- (4 - methyclcyclohex - 3 - enoyloxymethyl) - 2,6 - dioxacyclohexanone and the like; the mono-alkyl, mono-alkenylaroyloxymethyl substituted 2,6 - dioxacyclohexanones, e.g., 4-butyl-4-(4-prop-3-enylbenzoyloxymethyl)-2,6-dioxacyclohexanone, and the like; the mono-cycloalkyl, mono-alkenoyloxymethyl substituted 2,6-dioxacyclohexanones, e.g., 4-cyclohexyl-4-acryloyloxymethyl-2,6-dioxacyclohexanone, and the like; the mono-aryl, mono-alkenoyloxy methyl substituted 2,6-dioxacyclohexanones, e.g., 4-phenyl-4-methacryloyloxymethyl - 2,6 - dioxacyclohexanone, 4-tolyl-4-acryloyloxymethyl-2,6-dioxacyclohexanone, and the like; the mono-alkoxyalkyl, mono-alkenoyloxymethyl substituted 2,6-dioxacyclohexanones, e.g., 4-propoxymethyl-4-crotonoyloxymethyl - 2,6 - dioxacyclohexanone, 4 - pentoxymethyl - 4 - acryloyloxymethyl -2,6-dioxacyclohexanone, and the like.

In general, the preparation of the novel compositions of the aforementioned embodiments of this invention can be effected by an Aldol condensation of the appropriate aldehyde with formaldehyde, followed by a Cannizzaro reaction and finally a low temperature phosgenation, or ester interchange reaction of the resulting diol or triol. For example, in the preparation of compounds of the first embodiment of this invention, an unsaturated aldehyde having an hydrogen atom on the carbon atom in the alpha position adjacent to the carbonyl group, is subjected to an aldol condensation with at least one mole of formaldehyde followed by a Cannizzaro reaction with an additional mole of form aldehyde wherein the aldheyde is reduced to the alcohol. The following reaction illustrates the sequence of steps:

(1) 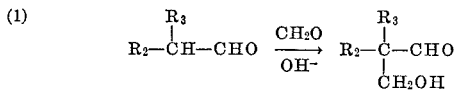

(2) 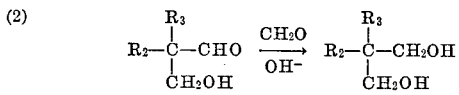

wherein $R_2$ and $R_3$ are the same as previously indicated.

The mole ratio of formaldehyde to the olefinically unsaturated aldehyde can vary over a considerable range. For example, a mole ratio of formaldehyde to aldehyde of from about 2.0:1.0 to about 10:1.0 and more preferably from about 2.0 to 4.0:1.0 can be employed.

Thereafter the unsaturated carbonate can be conveniently prepared by one or more procedures employed in the preparation of the saturated cyclic carbonates. For instance, the unsaturated carbonates can be obtained in relatively high yields by low temperature, i.e., room temperature, phosgenation of the diol in an inert medium in the presence of a tertiary amine:

(3) 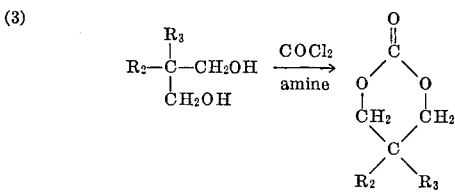

wherein $R_2$ and $R_3$ are again the same as indicated supra. Alternatively, the diol can be converted to the unsaturated carbonate by an ester interchange reaction utilizing a dialkyl carbonate, e.g., diethyl carbonate.

In the preparation of many of the novel unsaturated carbonates of the second and third embodiments of this invention, the same general procedure is following with two exceptions. First, the starting aldehyde is saturated and unsubstituted in the position alpha to the carbonyl group, and hence a saturated triol is obtained after the aldol condensation and Cannizzaro reaction rather than the unsaturated diol as indicated above:

(4) 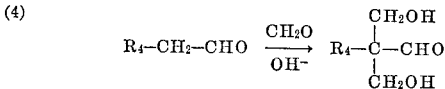

(5) 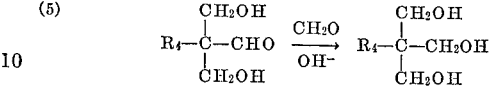

wherein $R_4$ is the same as previously indicated. The saturated triol employed for the third embodiment of this invention can be obtained in a similar manner with the $R_6$ variable in place of the $R_4$ of Equation 5 above.

Secondly, prior to the low temperature phosgenation or ester interchange of the triol, an unsaturated group is introduced into the molecule. In the preparation of the novel compositions of the second embodiment of the invention, an unsaturated hydrocarbyl halide is reacted with a molar excess of the triol in an alkaline medium to obtain the hydrocarbyloxymethyl diol which is then subjected to phosgenation or ester interchange:

(6) 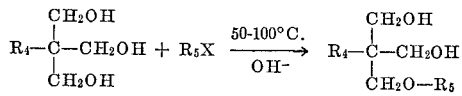

(7) 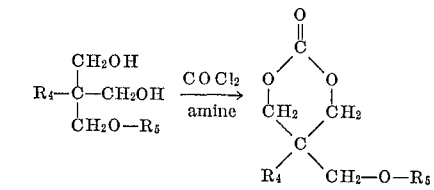

wherein $R_4$ and $R_5$ are as previously indicated and X represents halide, i.e., chloride, bromide, and the like. In the preparation of the compositions of the third embodiment, the group containing the olefinic bond is introduced into the molecule by reaction of a molar excess of the saturated triol with an unsaturated hydrocarboyl halide, i.e., an acyl halide followed by phosgenation or ester interchange to obtain the unsaturated carbonate:

(8) 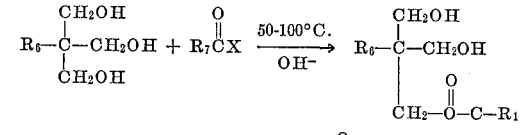

(9) 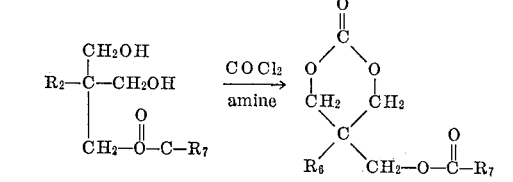

wherein $R_6$, $R_7$ and X have the same value as previously indicated.

Alternatively, the triol itself can contain the unsaturated group and the hydrocarbyl halide can be saturated to obtain compositions encompassed by the formula of the first embodiment wherein $R_2$ is hydrocarbyloxymethyl and $R_3$ represents an unsaturated hydrocarbyl group.

In a preferred and more specific aspect, the diols and triols are prepared by the dropwise addition of a 50 percent sodium hydroxide solution to a mixture of approximately one mole of the saturated or unsaturated aldehyde and approximately two to three moles of formaldehyde employed as 37 percent formalin solution while the mixture is continuously stirred. Addition of the hydroxide is maintained at such a rate that the reaction temperature remains within a range of from about 40° C. to about 70° C. and preferably from about 50° C. to about 55° C. When approximately one mole of the hydroxide has been added, the temperature is increased to a temperature of from about 80° C. to about 100° C. to complete the reduction of the aldehyde group. Upon completion of the reaction, the pH of the solution is adjusted to 6.0 by the addition of an acid such as formic acid, after which the solution is concentrated by distillation under reduced pressure of about 20 millimeters of mercury. The resulting two phases are separated, and the diol or triol distilled from the organic layer. Other hydroxides such as potassium hydroxides may be used to promote both the aldol condensation step and the Cannizzaro reaction.

In those instances wherein the product obtained is an unsaturated diol, it can be subjected to low temperature phosgenation or ester interchange directly. However, as previously indicated, where the product is a saturated or unsaturated triol, one of the hydroxyl groups is first reacted with a halide to form the ether or ester prior to phosgenation. The reaction of the triol with the halide, e.g., allyl chloride, is preferably conducted in an inert medium at a temperature of from about 50° C. to about 100° C. in the presence of a suitable base, such as sodium hydroxide, potassium hydroxide and the like.

While reaction temperatures within the aforementioned range of from about 50° C. to about 100° C., have been found desirable, temperatures above and below this range can also be employed. However, from economic consideration the optimum yield and rate of reaction are attained within the aforesaid range. The particular temperature employed will be dependent, in part, upon the triol halide starting material. A molar excess of triol is employed to maximize the yield of diol. For example it is preferred that the mole ratio of triol to halide be from about 3:1 to about 10:1, and higher.

In practice, the conversion of the aforementioned diols to the novel carbonates of this invention is accomplished by the addition of a cooled 10 per cent solution of phosgene in toluene to a cooled solution containing an equal molar amount of the diol and antipyrine in a minimum volume of solvent, e.g., chloroform. The addition of phosgene solution is conducted at such a rate that the temperature is maintained at about 25° C. After standing, the mixture is filtered and the filtrate concentrated by evaporation and the residue dissolved in ether. Any water-soluble components are removed by water extraction, recovery of the desired reaction product effected by one of many common techniques such as filtration, distillation, extraction, vacuum sublimation, and the like.

In some instances, it may be desirable to conduct one or more of the aforesaid reactions in the presence of an inert, normally liquid organic solvent, although in some cases the use of a solvent is not required. Suitable solvents include, among others, aromatic hydrocarbons, such as, toluene, xylene, benzene, napthalene, diphenyl, amylbenzene; cycloaliphatic hydrocarbons, such as, cyclohexane, heptylcyclopentane; the chlorinated aromatic hydrocarbons, such as chlorobenzene, orthodichlorobenzene; and the like.

The starting materials employed in the preparation of the compositions of the aforementioned embodiments are the saturated or unsaturated aldehydes. Preferred aldehydes which can be employed include the olefinically unsaturated and saturated aliphatic, cycloaliphatic and aromatic hydrocarbon aldehydes containing from 3 to 26 carbon atoms and more preferably, from 3 to 20 carbon atoms.

Unsaturated aldehydes which are employed in the preparation of the novel compositions of the first embodiment of this invention include, among others, 2-methyl-3-butenal,
2-methyl-4-pentanal,
2-methyl-5-hexenal,
2-methyl-7-octenal,
2-ethyl-10-hendecenal,
2-methyl-13-tetradecenal,
2-ethyl-9-eicosenal,
2-methyl-25-hexacosenal,
4-pentenal, 7-octenal,
13-tetradecenal,
2-cyclohexyl-4-butenal,
2-cyclohexylmethyl-7-octenal,
2-(6-methylcyclohexylmethyl)-5-hexenal,
2-phenyl-4-butenal,
2-tolyl-5-hexenal,
2-benzyl-7-octenal,
2-methyl-2-cyclohex-3-enyl acetaldehyde,
2-butyl-2-(4-methylcyclohex-3-enyl) acetaldehyde,
2-propyl-2-styryl acetaldehyde,
2 - pentyl-2-[4-but-3-enyl)phenyl]acetaldehyde, and the like.

Saturated aldehydes which are employed in the preparation of the novel compositions of the second and third embodiments of this invention, i.e., the carbonates containing the unsaturation in the hydrocarbyloxymethyl groups include, among others, propionaldehyde, butyraldehyde, isobutyraldehyde, valeraldehyde, isovaleraldehyde, caproaldehyde, heptaldehyde, stearaldehyre, and the like.

As hereinbefore indicated, when a saturated aldehyde is employed as the starting material, the olefinic unsaturation can be introduced into the molecule by reacting a hydrocarbyl halide or acyl halide with one of the hydroxyl groups of the triol. Illustrative halides include, among others, vinyl chloride,
allyl chloride,
3-butenyl chloride,
4-pentenyl chloride,
5-hexenyl chloride,
6-heptenyl chloride,
7-octenyl chloride,
8-nonenylchloride,
11-dodecenyl chloride,
13-tetradecenyl chloride,
23-tetracosenyl chloride,
3-cyclohexenyl chloride,
3-cyclohexenylmethyl chloride,
4-allylphenylmethyl chloride,
styrene chloride,
acrylyl chloride,
3-butenoyl chloride,
4-pentenoyl chloride,
5-hexenoyl chloride,
6-heptenoyl chloride,
7-octenoyl chloride,
8-nonenoyl chloride,
11-dodecenoyl chloride,
23-tetracosenoyl chloride,
3-cyclohexenoyl chloride,
3-cyclohexenylmethanoyl chloride, and the like.

As previously indicated, the novel compositions which are obtained by the practice of this invention are a useful class of compounds having significant and unobvious properties in various fields of application. Due to their difunctional nature, the novel compositions are particularly attractive for use as reactive polymerizable monomers. For example, the unsaturated carbonates of this invention can be homopolymerized through the olefinic group, or copolymerized with other unsaturated carbonates or with other olefinically unsaturated organic compounds, e.g., vinyl monomers, through their olefinic groups, preferably in the presence of a peroxide catalyst to give linear solid polymeric products which have utility in the molding, laminating, and coating arts, e.g., manufacture of plastic toys which can be rigid or flexible, paperweights, inkstands, and the like.

Among the vinyl monomers which are contemplated are those which contain a polymerizable olefinic bond. Illustrative vinyl monomers include, for example, styrene, alkylstyrene, chlorostyrene, ethylstyrene, dimethylstyrene, isopropylstyrene, divinylbenzene, alkyl acrylate, alkyl methacrylate, alkyl crotonate, methyl acrylate, ethyl acrylate, n-propylacrylate, n-butyl acrylate, methyl methacrylate, ethyl methacrylate, isopropyl methacrylate, n-amyl methacrylate, methyl crotonate, ethyl crotonate, n-propyl crotonate, t-butyl crotonate, 2-ethylhexyl crotonate, vinyl acetate, vinyl propionate, vinyl butyrate, vinyl valerate, and the like. Additional desirable monomeric ethylenically unsaturated compounds include, for instance, triallyl cyanurate, diallyl phthalate, triallylamine, acrylonitrile, allyl acrylate, allyl methacrylate, allyl crotonate, allyl butyrate, allyl 2-ethylhexanoate, allyl benzoate, and the like.

The peroxide catalysts which can be employed include, for instance, benzoyl peroxide, methyl ethyl ketone peroxide, methyl isobutyl ketone peroxide, p-menthane hydroperoxide, t-butyl hydroperoxide, cumene hydroperoxide, acetyl peroxide, cyclohexanone peroxid, lauroyl peroxide, di-t-butyl peroxide, t-butyl perbenzoate, and the like.

The operative conditions, e.g., temperature and pressure, are of the order employed in the vinyl-type polymerization arts, e.g., 75°–150° C.

The novel unsaturated carbonates can also be homopolymerized or copolymerized through the carbonate group, in the presence of catalysts such as n-butyllithium, di-n-butylzinc, and triisobutylaluminum, at a temperature of from about 0° to about 200° C., and for a period of time sufficient to produce high molecular weight solid products. Inasmuch as the solid products resulting from the polymerization contain a plurality of pendant groups having olefinic sites, they can be cured via procedures well recognized in the synthetic and natural rubber arts, e.g., sulfur cure, to give hard, solid products. These products have utility as synthetic ebonites. In addition, they are also useful in the aforesaid plastics applications.

Additionally, carbonates can be contacted with an organic peracid to produce the corresponding vicinalepoxides. Among the peracids contemplated include, for example, the aliphatic peracids, the cycloaliphatic peracids, the aromatic peracids, and the like. The organic hydrocarbon peracids are preferred. Illustrative peracids include, for instance, peracetic acid, perpropionic acid, perbutyric acid, perhexanoic acid, perdodecanoic acid, perbenzoic acid monoperphthalic acid, and the like. The lower aliphatic hydrocarbon peracids which contain from 2 to 4 carbon atoms are highly suitable. Peracetic acid is most preferred. It is highly desirable to employ the peracid as a solution in an inert normally liquid organic vehicle such as ethyl acetate, butyl acetate, acetone, and the like. A solution comprising from about 10 to 50 weight percent of peracid, based on the total weight of peracid and inert organic vehicle is suitable; from about 20 to 40 weight percent of the peracid is preferred. The epoxidation reaction can be conducted at a temperature in the range of from about 0° C., and lower, to about 100° C., and higher, and preferably from about 20° C. to about 80° C. Substantial conversion of the monoethylenically unsaturated cyclic carbonate compound to the corresponding vicinal-epoxy cyclic carbonate compound is accomplished by employing at least one mol of peracid per mol of said monoethylenically unsaturated cyclic carbonate, e.g., from about 1.0 to about 10 mols of peracid per mol of said carbonate. In general, the epoxidation reaction is conducted for a period of time which is sufficient to introduce oxirane oxygen at the site in the carbonate reactant. Oftentimes, this reaction period is usually sufficient to essentially consume the quantity of peracid employed. Periodic analysis of samples of the reaction mixture to determine the quantity of peracid consumed during the epoxidation reaction can be readily performed by the operator by well-known techniques. At the termination of the epoxidation reaction, the unreacted ethylenically unsaturated carbonate precursor, acid by-product, inert vehicle, if employed, and the like, can be recovered from the reaction product mixture, for example, by distillation under reduced pressure. Further well-known procedures such as fractional distillation, and the like, can be used to purify the vicinalepoxy cyclic carbonate product.

The novel and useful vicinal-epoxy cyclic carbonate compounds can be homopolymerized or copolymerized with other vicinal-epoxy cyclic carbonates or with other mono- or poly-epoxides, preferably in the presence of an epoxy polymerization catalyst such as the metal halide Lewis acids, e.g., boron trifluoride, under typical epoxy polymerization conditions, to give solid polymeric products which are useful as paperweights, in the manufacture of toys, etc.

Among the mono- and polyepoxides which are contemplated include, among others, 4-vinylcyclohexene dioxide, dicyclopentadiene dioxide, divinylbenzene dioxide, 3,4-epoxy-6-methylcyclo hexylmethyl 3,4-epoxy - 6 - methylcyclohexanecarboxylate, diethylene glycol bis(3,4-epoxycyclohexanecarboxylate), bis(2,3 - epoxycyclopentyl) ether, butadiene dioxide, phenyl glycidyl ether, 1,2-epoxydodecane, and the like.

In addition, the novel vicinal-epoxy cyclic carbonates with or wtihout a polyepoxide such as those illustrated previously, can be reacted with an active organic hardener such as polycarboxylic acids, polycarboxylic acid anhydrides, polyfunctional amines, polyols, polythiols, polyisocyanates, polyacyl halides, and the like, preferably in the presence of a typical epoxy polymerization catalyst, $BF_3$-etherate, under conventional curing conditions, to produce solid epox resins which are useful in the laminating, coating, molding, and encapsulating arts.

The following examples are illustrative:

EXAMPLE I 4-methyl-4-allyl-2,6-dioxacyclohexanone (A) Preparation of 2-methyl-2-hydroxymethyl-4-pentenol.—To a well-stirred mixture of 686 parts of 2-methyl-4-pentenal and 1200 parts of 37 percent Formalin is added dropwise 563 parts of 50 percent caustic soda at a rate such that the reaction temperature is maintained at 50°–55° C. This addition requires varying periods of time depending on the amount of external cooling supplied. Upon completion of the caustic soda addition, the reaction temperature is raised to 90°–95° C. and maintained thereat for approximately one hour. At this point, the reaction mixture is neutralized with formic acid, stirring is discontinued, and the mixture is cooled to room temperature. The two phase system which results is separated mechanically and the organic layer (1165 parts) is charged to a refining still. Water (242 parts) is first removed at a pressure of 20 millimeters of mercury, whereupon the pressure is further reduced to 1 millimeter pressure and the product is stripped overhead. The yield of diol, distilling at 94°–95° C. under 1 millimeter pressure, is 862 parts, or 83.7 percent of the theoretical quantity. A sample prepared in this manner had a boiling point of 94°–95° C. at 1 millimeter of mercury and the following analysis: Calculated (percent): C, 64.3; H, 10.8; found (percent): C, 64.6; H, 11.0.

(B) Preparation of 4-methyl-4-allyl-2,6 - dioxacyclohexanone.—A cooled 10 percent solution of 0.1 mole of phosgene in toluene is added with stirring to a cooled solution of 12.9 grams (0.1 mole) of 2-methyl-2-hydroxymethyl-4-pentenol and 0.2 mole of antipyrine in a minimum volume of chloroform, at such a rate that the temperature is maintained at about 25° C. the mixture is then allowed to remain overnight at this temperature, then filtered to remove the antipyrine hydrochloride. The filtrate is concentrated by evaporating the bulk of the toluene-chloroform solvent, and the residue is dissolved in ether. The water soluble components are removed by water extraction, the ether layer dried and concentrated by removal of the solvent. The crude unsaturated carbonate is removed by distillation. Infrared analysis in-

EXAMPLE II 4-ethyl-4-allyl-2,6-dioxacyclohexanone (A) Preparation of 2-ethyl-2 - hydroxymethyl-4-pentenol.—To a well-stirred mixture of 784 parts of 2-ethyl-4-pentenal and 1250 parts of 37 percent Formalin solution is added dropwise 570 parts of 50 percent caustic soda at a rate such that the reaction temperature is maintained at 50°–55° C. Upon completion of the caustic soda addition, the reaction temperature is raised to 90°–95° C. and maintained thereat for one hour. The reaction mixture is then neutralized with formic acid and concentrated by removing 353 parts of water by distillation at 100 millimeters of mercury pressure. The two phase system is then separated and to the organic layer (1125 parts) is added 200 parts of di-n-butyl ether. Drying of the organic layer is accomplished at 100 millimeters of mercury pressure by removing 111 parts of water from the n-butyl ether-water azeotrope. Upon completion of drying, the hot solution is filtered to remove 58 parts of sodium formate and the filtrate is refined by vacuum distillation. The yield of diol, boiling from 98°–102° C. at 1–2 millimeters mercury pressure, is 748 parts or 82.8 percent of the theoretical quantity at a 98.7 percent conversion of 2-ethyl-4-pentenal. The refined distillate, on standing undisturbed for several days at room temperature, eventually sets to a white crystalline mass. A sample of the crystalline material had a melting point 29°–30° C. and the following analysis: Calculated (percent): C, 66.6; H, 11.1; found (percent): CC, 65.8; H, 113.

(B) Preparation of 4 - ethyl-4-allyl - 2,6-dioxacyclohexanone.—A cooled 10 percent solution of 0.1 mole of phosgene in toluene is added with stirring to a cooled solution of 14.3 grams (0.1 mole) of 2-ethyl-2-hydroxymethyl-4-pentenol and 0.2 mole of pyridine in a minimum volume of chloroform, at such a rate that the temperature is maintained at about 25° C. the mixture is then allowed to remain overnight at this temperature, then filtered to remove the antipyrine hydrochloride. The filtrate is concentrated by evaporating the bulk of the toluene-chloroform solvent, and the residue is dissolved in ether. The water soluble components are removed by water extraction, the ether layer dried and concentrated by removal of the solvent. The crude unsaturated carbonate is removed by distillation. Infrared analysis indicates that the product obtained is in agreement with that of the assigned structure.

EXAMPLE III 4-methoxymethyl-4-allyl-2,6-dioxacyclohexanone (A) Preparation of 2,2 - bis-(hydroxymethyl)-4-pentenol.—To a well-stirred mixture of 756 parts 4-pentenal and 2315 parts of 37 percent Formalin solution is added dropwise 736 parts of 50 percent caustic soda at such a rate as to maintain a reaction temperature of 50°–55° C. This addition requires approximately two hours, but can be accelerated by employing external cooling. Upon completion of the caustic soda addition, the temperature is raised to 90° C. in order to complete the Cannizzaro reaction. The latter temperature is maintained for about one hour, or until the completion of the reaction is indicated by the appearance of a deep brown color. The pH of the solution is then adjusted to 6.0 by the addition of formic acid, after which the aqueous solution is concentrated by distillation at 100 millimeters of mercury pressure, 1404 parts of water being stripped overhead. At this point, stirring is discontinued, the product is allowed to layer out, and the two layers are separated mechanically.

To the upper layer (1567 parts) is added 2499 parts of methyl isobutyl ketone, after which drying is completed at 100 millimeters pressure by removing water from the methyl isobutyl ketone-water constant boiling mixture. The temperature is then raised to 90°–95° C. and the mixture filtered by suction through a sintered glass funnel to remove any sodium formate which has separated from solution during the azeotropic drying. The filtrate is chilled to −10 C. and crude triol (830 parts), which separates out as a crystalline solid, is recovered by filtration.

To the filtrate (2631 parts) is added the water layer (829 parts) from the initial separation, the recovered sodium formate, and 100 parts of water washings. The mixture is first dried at 100 millimeters by removing water from the methyl isobutyl ketone water constant boiling mixture, then heated to 90°–95° C. and filtered as before to remove sodium formate. The filtrate (2487 parts) is then concentrated to a volume of 300–500 cc. by distillation at 100 mm. after which the concentrated solution is chilled to −10° C. The crude triol (130 parts) which cystallizes is recovered, as before, by filtration.

The over-all yield of crude material is 960 parts, or 73.7 percent of the theoretical amount. The yield based on material recrystallized from methylisobutylketone is 54.4 percent of the theoretical quantity. A sample of pure material had a melting point of 90°–91° C. and the following analysis: Calculated (percent): C, 57.6; H, 9.6; found (percent): C, 57.6; H, 9.8.

(B) Preparation of 2-methoxymethyl - 2 - hydroxymethyl-4-pentenol.—To a reaction flask equipped with stirrer, condenser and thermometer are changed 2 mols of 2,2-bis(hydroxymethyl)-4-pentenol and 1500 millimeters of dioxane. One mol of sodium methoxide is then added, the reactant mixture is heated to 80° C., and the coproduct methanol is removed via distillation. The reactants are then cooled to 10° C. and one mol of methyl chloride is added over a period of one hour while the reactants are well agitated. The reactants are heated to reflux and agitated for one hour. The dioxane is now removed via distillation and the product mix is diluted with 20 milliliters of water. The reactant mixture is subjected to a continuous extraction with chloroform for a period of 48 hours. The chloroform extract is dried, the chloroform is removed via distillation and the residue is subjected to a vacuum of 1 mm. Hg at which pressure the methyl ether is separated from the excess 2,2-bis(hydroxymethyl 4-pentenol by distillation. The resulting 2-methoxymethyl-2-hydroxymethyl-4-pentenol product is identified by elemental analysis and by analysis of the hydroxyl groups with phthalic anhydride.

(C) Preparation of 4-methoxymethyl-4-allyl-2,6-dioxacyclohexanone.—A cooled 10 percent solution of 0.1 mole of phosgene in toluene is added with stirring to a cooled solution of 15.8 grams (0.1 mole) of 2-methoxymethyl - 2 - hydroxymethyl - 4 - pentenol and 0.2 mole of antipyrine in a minimum volume of chloroform, at such a rate that the temperature is maintained at about 25° C. the mixture is then allowed to remain overnight at this temperature, then filtered to remove the antipyrine hydrochloride. The filrate is concentrated by evaporating the bulk of the toluene-chloroform solvent, and the residue is dissolved in ether. The water soluble components are removed by water extraction, the ether layer dried and concentrated by removal of the solvent. The unsaturated carbonate is removed by distillation. Infrared analysis indicates that the product obtained is in agreement with that of the assigned structure.

EXAMPLE IV 4-ethyl-4-alkyloxymethyl-2,6-dioxacyclohexanone (A) Preparation of 2-hydroxymethyl-2-allyloxymethyl butanol.— To a reaction flask equipped with stirrer, condenser, and thermometer are charged 3 mols of 2,2-bis (hydroxymethyl) butanol, prepared in a manner similar to that set forth in Example I-A from n-butanol, and 1500 milliliters of dioxane. One mol of sodium methoxide is then added, the reactant mixture is heated to 80° C., and the co-product methanol is removed via distillation. The reactants are then cooled to 10° C. and one mol of allyl chloride is added over a period of one hour while the reactants are well agitated. The reactants are heated to reflux and agitated for one hour. The dioxane is now removed via distillation and the product mix is diluted with 200 milliliters of water. The reactant mixture is subjected to a continuous extraction with chloroform for a period of 48 hours. The chloroform extract is dried, the chloroform is removed via distillation and the residue is subjected to a vacuum of 1 mm. Hg at which pressure the allyl ether is separated from the excess 2,2-bis(hydroxymethyl) butanol by distillation. The resulting 2-hydroxymethyl-2-allyloxymethyl butanol is a solid product which is identified by elemental analysis and by analysis of the hydroxyl groups with phthalic anhydride.

(B) Preparation of 4-ethyl-4-allyloxymethyl-2,6-dioxacyclohexanone.—A cooled 10 percent solution of 0.1 mole of phosgene in toluene is added with stirring to a cooled solution of 17.4 grams (0.1 mole) of 2-hydroxymethyl-2-allyloxymethyl butanol and 0.2 mole of antipyrine in a minimum volume of chloroform, at such a rate that the temperature is maintained at about 25° C. the mixture is then allowed to remain overnight at this temperature, then filtered to remove the antipyrine hydrochloride. The filtrate is concentrated by evaporating the bulk of the toluene-chloroform solvent, and the residue is dissolved in ether. The water soluble components are removed by water extraction, the ether layer dried and concentrated by removal of the solvent. The unsaturated carbonate is removed by distillation. Infrared analysis indicates that the product obtained is in agreement with that of the assigned structure.

EXAMPLE V 4-methyl-4-acryloyloxymethyl-2,6-dioxacyclohexane (A) Preparation of 2-hydroxymethyl-2-acryloyloxymethyl propanol.—To a reactor flask equipment with stirrer, thermometer, and distillation column, there is charged 2 mols of 2,2-bis-(hydroxymethyl)propanol, one mol of methyl acrylate, 500 milliliters of toluene, 0.5 g. of hydroquinone, and 0.3 g. of sodium. The reactants are heated to about 100° C. and over a period of 3 hours the resulting co-product methanol is removed via distillation. After removal of the toluene in vacuo, the resulting ester is separated from 2,2-bis(hydroxymethyl) propanol by distillation at 0.5 mm. Hg. The distillate is stabilized against polymerization by addition of 0.1 percent hydroquinone. Redistillation of the crude ester at a pressure of 0.5 mm. Hg results in the product 2-hydroxymethyl-2-acryloyloxymethyl propanol as confirmed by elemental analysis.

(B) Preparation of 4-methyl-4-acryloyloxymethyl-2,6-dioxacyclohexanone.—A cooled 10 percent solution of 0.1 mole of phosgene in toluene is added with stirring to a cooled solution of 16.0 grams (0.1 mole) of 2-hydroxymethyl-2-acryloxymethyl propanol and 0.2 mole of antipyrine in a minimum volume of chloroform at such a rate that the temperature is maintained at about 25° C. The mixture is then allowed to remain overnight at this temperature, then filtered to remove the antipyrine hydrochloride. The filtrate is concentrated by evaporating the bulk of the toluene-chloroform solvent, and the residue is dissolved in ether. The water soluble components are removed by water extraction, the ether layer dried and concentrated by removal of the solvent. The unsaturated carbonate is removed by distillation. Infrared analysis indicates that the product obtained is in agreement with that of the assigned structure.

Although the invention has been illustrated by the preceding examples, it is not to be construed as limited to the materials employed therein but rather the invention encompasses the generic area as hereinbefore disclosed. Various modifications and embodiments of this invention can be made without departing from the spirit and scope thereof.

What is claimed is:

1. An unsaturated carbonate of the formula:

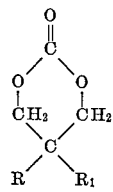

wherein R contains up to 24 carbon atoms and represents a member selected from the class consisting of hydrocarbyl, or hydrocarbyloxymethyl groups free from polynuclear aromatic moieties and acetylenic unsaturation; $R_1$ contains up to 24 carbon atoms and represents a member selected from the class consisting of hydrocarbyl, hydrocarbyloxymethyl or hydrocarboyloxymethyl groups free from polynuclear aromatic moieties and acetylenic unsaturation; and 2 carbon atoms of said R or $R_1$ groups being bonded by olefinic unsaturation, with the proviso that when R is alkyl, $R_1$ is not alkenyloxymethyl.

2. An unsaturated carbonate of the formula:

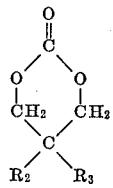

wherein $R_2$ contains up to 24 carbon atoms and represents a member selected from the class consisting of hydrocarbyl and hydrocarbyloxymethyl groups free from polynuclear aromatic moieties and acetylenic and olefinic unsaturation and $R_3$ contains up to 24 carbon atoms and represents a hydrocarbyl group containing one olefinically unsaturated group.

3. An unsaturated carbonate of the formula:

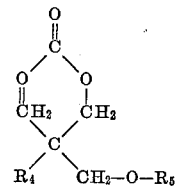

wherein $R_4$ contains up to 24 carbon atoms and represents a member selected from the class consisting of cycloalkyl, aryl, and hydrocarbyloxymethyl groups free from polynuclear aromatic moieties and free from acetylenic and olefinic unsaturation and $R_5$ contains up to 24 carbon atoms and represents a hydrocarbyl group free from polynuclear aromatic moieties and contains one olefinically unsaturated group.

4. An unsaturated carbonate of the formula

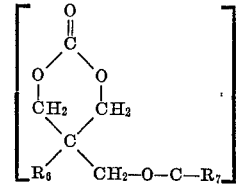

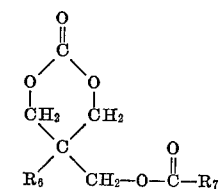

wherein $R_6$ contains up to 24 carbon atoms and represents a member selected from the class consisting of hydrocarbyl and hydrocarbyloxymethyl free from polynuclear aromatic moieties and free from acetylenic and olefinic unsaturation and $R_7$ contains up to 24 carbon atoms and represents a hydrocarbyl group free from polynuclear aromatic moieties and contains one olefinically unsaturated group.

5. 4-alkyl-4-alkenyl-2,6-dioxacyclohexanone of claim 1 wherein said alkyl and alkenyl contain up to 24 carbon atoms.

6. 4 - cycloalkyl - 4 - alkenyl - 2,6 - dioxacyclohexanone of claim 1 wherein said cycloalkyl and alkenyl contain up to 24 carbon atoms.

7. 4-aryl-4-alkenyl-2,6-dioxacyclohexanone of claim 1 wherein said aryl is unsubstituted and free from polynuclear aromatic moieties, and said aryl and alkenyl contain up to 24 carbon atoms.

8. 4 - alkoxymethyl - 4 - alkenyl - 2,6 - dioxacyclohexanone of claim 1 wherein said alkoxyalkyl and alkenyl contain up to 24 carbon atoms.

9. 4 - cycloalkyl - 4 - alkenyloxymethyl - 2,6 - dioxacyclohexanone of claim 1 wherein said cycloalkyl and alkenyloxymethyl contain up to 24 carbon atoms.

10. 4 - aryl - 4 - alkenyloxymethyl - 2,6 -dioxacyclohexanone of claim 1 wherein said aryl is unsubstituted and free from polynuclear aromatic moieties, and said aryl and alkenyloxymethy contain up to 24 carbon atoms.

11. 4 - alkoxyalkyl - 4 - alkenyloxymethyl - 2,6 - dioxacyclohexanone of claim 1 wherein said alkoxyalkyl and alkenyloxymethyl contain up to 24 carbon atoms.

12. 4 - alkyl - 4 - alkenoyloxymethyl - 2,6 - dioxacyclohexanone of claim 1 wherein said alkyl and alkenoyloxymethyl contain up to 24 carbon atoms.

13. 4 - cycloalkyl - 4 - alkenoyloxymethyl - 2,6 - dioxacyclohexanone of claim 1 wherein said cycloalkyl and alkenoyloxymethyl contain up to 24 carbon atoms.

14. 4 - aryl - 4 - alkenoyloxymethyl - 2,6 - dioxacyclohexanone of claim 1 wherein said aryl is unsubstituted and free from polynuclear aromatic moieties, and said aryl and alkenoyloxymethyl contain up to 24 carbon atoms.

15. 4 - alkoxyalkyl - 4 - alkenoyloxymethyl - 2,6 - dioxacyclohexanone of claim 1 wherein said alkoxyalkyl and alkenoyloxymethyl contain up to 24 carbon atoms.

16. 4-methyl-4-allyl-2,6-dioxacyclohexanone.
17. 4-ethyl-4-allyl-2,6-dioxacyclohexanone.
18. 4-methoxymethyl-4-allyl-2,6-dioxacyclohexanone.
19. 4 - methyl - 4 - acryloyloxymethyl - 2,6 - dioxacyclohexanone.

References Cited
UNITED STATES PATENTS 2,924,607   2/1960   Pattison _____ 260—333

NORMA S. MILESTONE, Primary Examiner

U.S. Cl. X.R.

260—77.5, 80, 80.3, 88.3, 240, 469, 486, 488, 544, 599, 600, 601, 602, 618, 635